L. A. THOMAS.
TANDEM DRAFT CONNECTION FOR HARVESTERS.
APPLICATION FILED APR. 29, 1912.
1,085,367.
Patented Jan. 27, 1914.
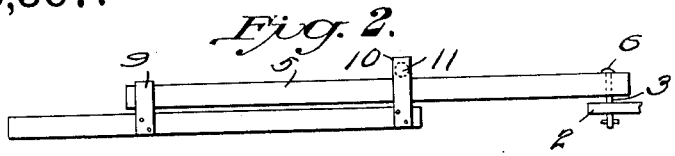
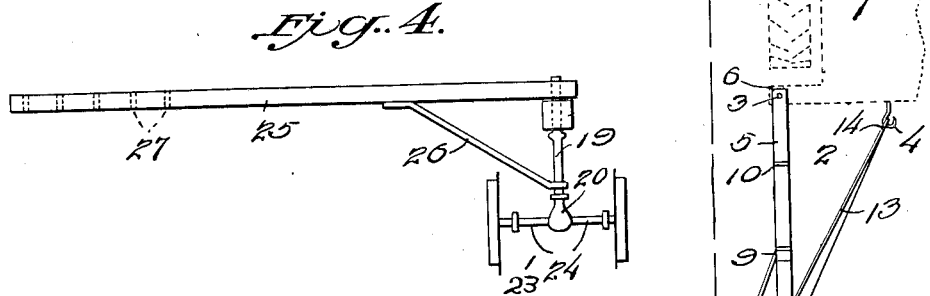
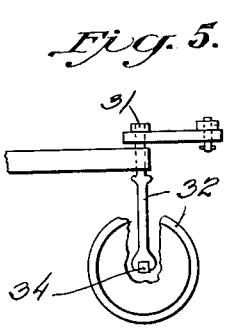
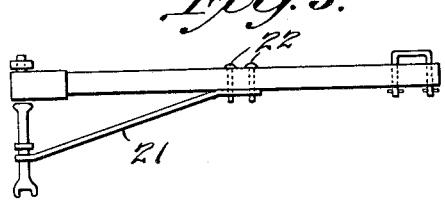
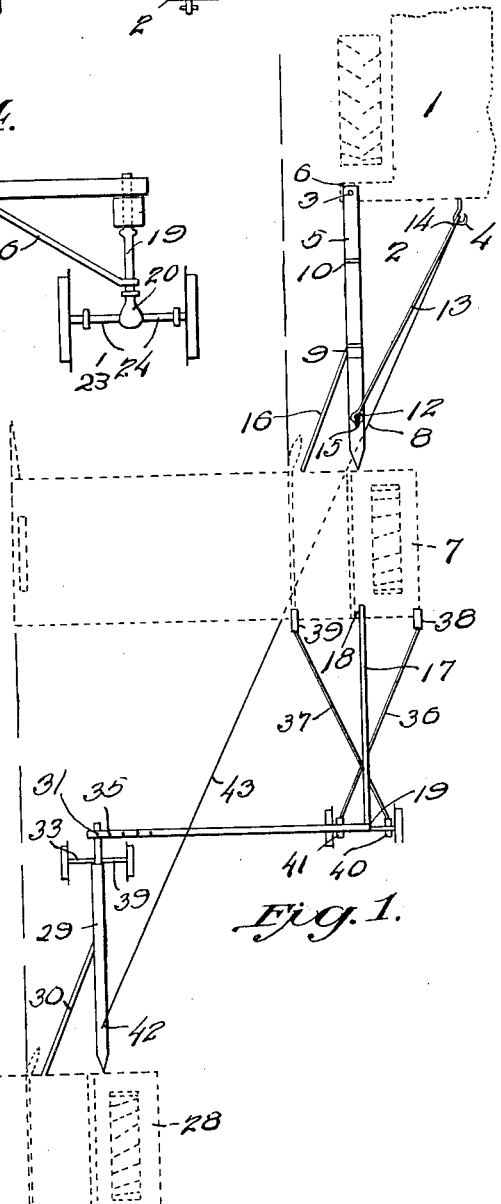
Witnesses:
H. H. Wray
Hugh Miller
Inventor:
Lewis A Thomas

UNITED STATES PATENT OFFICE.

LEWIS A. THOMAS, OF IRRICANA, ALBERTA, CANADA.

TANDEM DRAFT CONNECTION FOR HARVESTERS.

1,085,367.            Specification of Letters Patent.       Patented Jan. 27, 1914.

Application filed April 29, 1912. Serial No. 694,026.

*To all whom it may concern:*

Be it known that I, LEWIS A. THOMAS, residing in the town of Irricana, in the Province of Alberta, Dominion of Canada, have invented certain new and useful Improvements in Tandem Draft Connections for Harvesters, of which the following is a full, clear, and exact description.

The invention relates to improvements in tandem draft connections for harvesters as described in the present specification and illustrated in the accompanying drawings that form part of the same.

The invention consists essentially in the novel construction and arrangement whereby in the combination of parts flexibly joined to one another and to the machines, the positions of said machines are positively fixed in relation to one another.

The objects of the invention are to devise a simple and efficient means of connecting up a traction engine to a plurality of binders, to effect economy by making a much wider cut through the field of grain coincidently with the single trip of the traction engine, to devise a mechanism easy to assemble and cheap to manufacture, and generally to provide a means of connecting the traction engine to a plurality of binders which will afford the farmer much satisfaction and profit without materially adding to his costs.

In the drawings, Figure 1 is a plan view of the tandem arrangement. Fig. 2 is a detail showing the flexibly arranged connecting parts between the first binder and the traction engine. Fig. 3 is a detail showing a bar and its mounting forming one of the links of the intermediate connections between binders. Fig. 4 is a detail showing a transverse link in said intermediate connections and its connections to a truck. Fig. 5 shows the connection between the link mounting and the axle of a truck.

Like numerals of reference indicate corresponding parts in each figure.

Referring to the drawings, 1 represents the traction engine having at the rear end thereof a rigid bar 2 for coupling purposes, said bar 2 at one corner thereof having a pivot hole 3.

4 is the projecting eye end of a draw bar extending rearwardly from the engine about the center thereof.

5 is a thrust bar secured to the rigid bar 2 by means of a pivot bolt 6 extending through said bar 5 and through said pivot hole 3.

7 is the binder having a tongue 8 projecting forwardly therefrom under the thrust bar 5 and held to said thrust bar 5 of the straps 9 and 10, said straps being fixedly secured to said tongue and loosely embracing said thrust bar, the strap 10 being slightly higher than the strap 9 and carrying the roller bearing 11 engaging the upper side of the thrust bar 5, and considerably facilitating the sliding of the said thrust bar in said straps.

12 is a hook rigidly secured in the tongue 8 adjacent to the root end of said tongue.

13 is a coupling link formed of a rod having at one end the hook 14 engaging the eye 4 and at the other end the eye 15 engaging the hook 12, thereby completing the connection of the traction engine 1 to the binder 7.

16 is a strut reinforcing the tongue 8 from the binder frame.

It will now be seen that on the movement of the traction engine forwardly the strain of the pull will be on the tongue 8, the link 13 and the draw bar of the engine, while the thrust bar 5 will have the effect of maintaining the binder in a path of its own as the strain on said thrust bar is lateral and insures the continuance of the oblique arrangement of the coupling link 13 in relation to the direction of the pull.

17 is a link or tongue in the intermediate connections, that is to say the connections between the binders, said link or tongue at its front end being secured in the clevis 18 on the binder 7, and at its rear end pivotally secured on the post 19, said post forming a link mounting having a forked lower end 20.

21 is a strut secured to the post 19 intermediate of the height thereof and on the under side of the link 17 by the bolts 22.

23 is a two wheeled truck having the post 19 mounted on its axle 24.

25 is a transverse link pivotally mounted on the post 19 above the link 17 and braced from said post by the strut 26, said link 25 having a plurality of pin holes 27 at its outer end thereof for adjusting the distance of the connections.

28 is a second binder having the tongue 29 projecting forwardly therefrom braced by the strut 30 in the binder frame, said tongue toward its outer end being pivotally mounted on the post 31 and projecting beyond said post, said post 31 having a forked lower end 32.

33 is a two wheeled truck carrying the post 31 centrally on its axle 34.

35 is a pin pivotally joining the transverse link 25 at the outer end of the tongue 29.

36 and 37 are stay rods crossed and at their front ends hooked to the lugs 38 and 39 at the rear end of the binder 7, and at their rear ends to the lugs 40 and 41 from the axle 24 adjacent to the wheels of the truck 23, thus completing a flexible joint connection between the binders 7 and 28.

42 is a hook secured to the tongue 29 adjacent to the root end thereof.

43 is a coupling chain or cable secured at one end to the hook 42 and at the other end to the eye 4 of the draw bar.

It will now be seen that the second binder is coupled to the traction engine and at the same time a flexible joint connection is made between the first binder and the second binder and this arrangement may be continued for as many binders as the traction engine has power enough to haul, or as many binders as are required for the work to be done, always provided that the power of the engine is sufficient.

In the operation the engine is started and effects a pull on the coupling link 13 and the coupling chain 43 which has the effect of drawing the binders forwardly, and as the tongues of said binders are pointed direct in a forward direction similar to the direction of the traction engine, said binders will not follow the oblique direction of the coupling link and chain, but continue in the same direction as the traction engine though in different paths, because the tongue of the first binder is fixed in regard to lateral movement on the engine, and the same may be said of the second binder as to the lateral movement for its position is maintained, that is to say it is fixed as regards lateral movement by the transverse link 25 which extends from the truck 23. The truck 23 is stayed in relation to binder 7 by the stay rods 36 and 37, therefore the paths of the two binders must be different and thereby cover a wider area of ground.

It will be noticed that while all the parts are attached together or to the binders in a flexible manner such is necessary in the travel of implements over fields, but notwithstanding these flexible joints the connections are made so that the positions of the machines in relation to one another are positively fixed.

What I claim is:—

1. In a tandem draft connection for harvesters, a draft appliance having a suitable draw bar, a harvesting machine operating in a different path from the path of the travel of said machine and having a tongue projecting forwardly therefrom, a thrust bar slidably arranged on said tongue and secured to the rear end of said draft appliance adjacent to one side thereof, and a coupling link secured to said tongue adjacent to the machine and secured to said draw bar of the draft appliance extending obliquely in relation to the travel of said machine.

2. In a tandem draft connection for harvesters, a draft appliance, a harvesting machine operating in a different path from the path of the travel of said appliance and having a tongue projecting forwardly, straps rigidly secured to said tongue extending upwardly thereabove, a thrust bar sliding in said straps and pivotally secured to a rear corner of said draft appliance, and a coupling link secured to said tongue adjacent to the machine and extending in an oblique direction in relation to the line of travel of said machine and secured to said appliance.

3. In a tandem draft connection for harvesters, a traction engine having a suitable draw bar, a harvesting machine operating in a different path from the path of travel of said traction engine and having a tongue projecting forwardly therefrom, metal straps rigidly secured to said tongue and projecting upwardly therefrom, a roller bearing journaled in one of said straps, a thrust bar sliding on said tongue within said straps and pivotally secured to the rear corner of said traction engine, and a coupling link hooked to said tongue adjacent to the root thereof and to said draw bar in a fixed angular arrangement in relation to said tongue.

4. In a tandem draft connection for harvesters, a draft appliance, a plurality of harvesting machines having tongues projecting therefrom in a straight line in the direction of said machine and appliance, said machines operating in different paths from said draft appliance and from one another, a coupling link from the forward tongue to said draft appliance, a bar joining said tongue to said draft appliance and maintaining said tongue and said coupling link at a fixed angle in relation to one another, a plurality of two wheeled trucks in pairs between the machines, a tongue projecting forwardly from one of said trucks to the front machine, the other of said trucks having the tongue from the following machine, a transverse link connecting the tongue from the machine to the tongue from the truck, stay rods connecting the axle of said truck with the front machine, and a coupling member extending from the tongue of a rear machine through a front machine to the draft appliance in an oblique direction in relation to the line of travel of said machine.

5. In a tandem draft connection for harvesters, a plurality of harvesting machines, a plurality of supplementary trucks, a tongue reaching from one of said trucks and secured to a front binder and a transverse link secured to the same truck and to the tongue of a rear binder, said tongue being carried by one of said trucks, a pair of stay rods crossed and secured to a front binder and to the axle of said tongued truck, a draft appliance, a coupling chain or cable extending from the tongue of a rear machine in an oblique direction in relation to the line of travel of said machine and secured to said draft appliance, and means for connecting the said draft appliance with the front machine.

6. In a tandem draft connection for harvesters, a traction engine having a draw bar and a rigid bar thereacross at the rear end and a pivot hole in one corner of said rigid bar, a thrust bar pivotally secured to said rigid bar in said pivot hole, a harvesting machine having a tongue projecting forwardly therefrom, a plurality of straps rigidly secured to said tongue and embracing said thrust bar, a link hooked at one end to said draw bar and at the other end to said tongue adjacent to said harvesting machine, a supplementary two wheeled truck, a pair of stay rods crossed suitably hooked to said harvesting machine at their front ends and to the axle of said truck at their rear ends, a tongue projecting forwardly from said truck and suitably secured to the rear end of said harvesting machine, a post extending upwardly from the axle of said truck and carrying at its upper end said tongue, a transverse link at one end mounted on said post, a second harvesting machine having a tongue projecting forwardly therefrom and pivotally connected to said transverse link, a two wheeled truck, a post mounted on the axle of said truck and carrying said tongue, and a chain or cable extending from the tongue of the rear machine through the front machine to the draw bar and secured to said draw bar.

7. In a tandem draft connection for harvesters, a traction engine having a draw bar extending rearwardly therefrom and a rigid bar thereacross at the rear end and pivot holes in said rigid bar, a thrust bar pivotally secured to said rigid bar in said pivot hole, a harvesting machine having a tongue projecting forwardly and slidably arranged in relation to said thrust bar and connected therewith, a coupling link hooked at one end to said tongue and at the other end to said draw bar, a plurality of two wheeled trucks having posts projecting upwardly from the axles thereof forming mountings, a pair of cross stay rods hooked at their front ends to the rear of the front machine and at their rear ends to one of said trucks, a link or tongue secured to the rear of said front machine and mounted from the truck held by said stay rods, a transverse bar forming a link mounted at one end of said post from said truck held by the stay rods and having a plurality of pin holes suitably spaced and toward the other end a harvesting machine behind the aforesaid harvesting machine, and operating in a different path and having a tongue projecting forwardly engaging the post on the other truck and at its extreme outer end pivotally held to said transverse link through one of said holes in said link, and a chain or cable connecting the tongue of the rear machine with the draw bar of said engine.

LEWIS A. THOMAS.

Witnesses:
 Geo. H. Ross,
 Chas. C. Gump.